June 23, 1925.
C. A. LARE
1,543,015
COMBINED PHOTOGRAPHIC PRINTER AND ENLARGER
Filed March 5, 1923     3 Sheets-Sheet 1
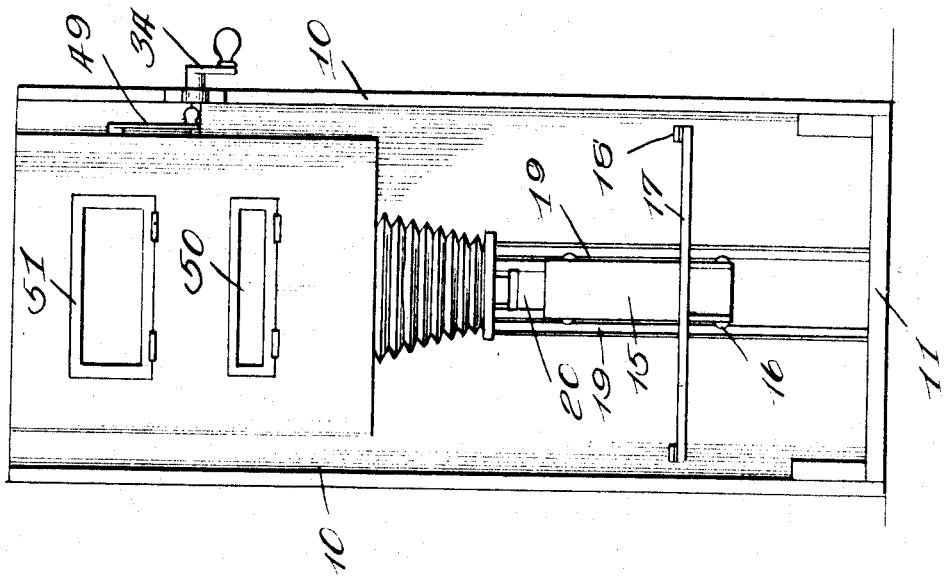
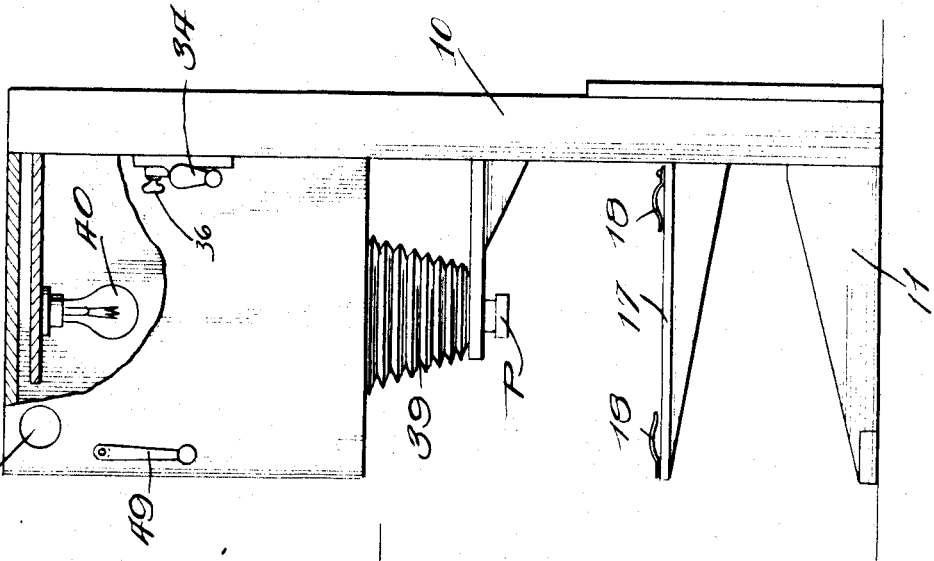
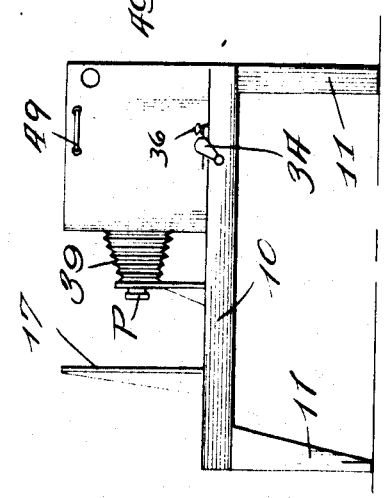
Inventor
Charles A Lare
By Watson E. Coleman
Attorney

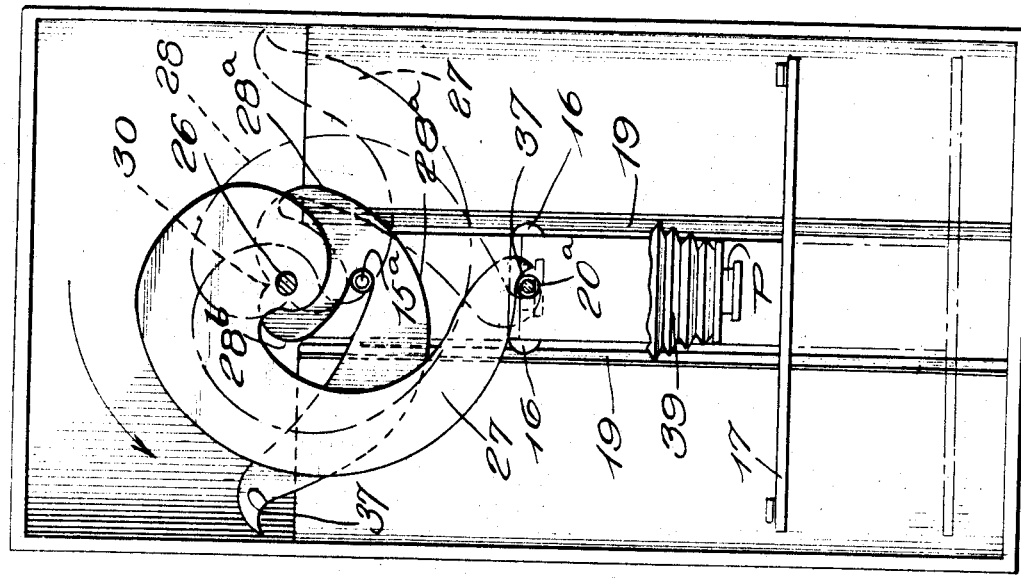
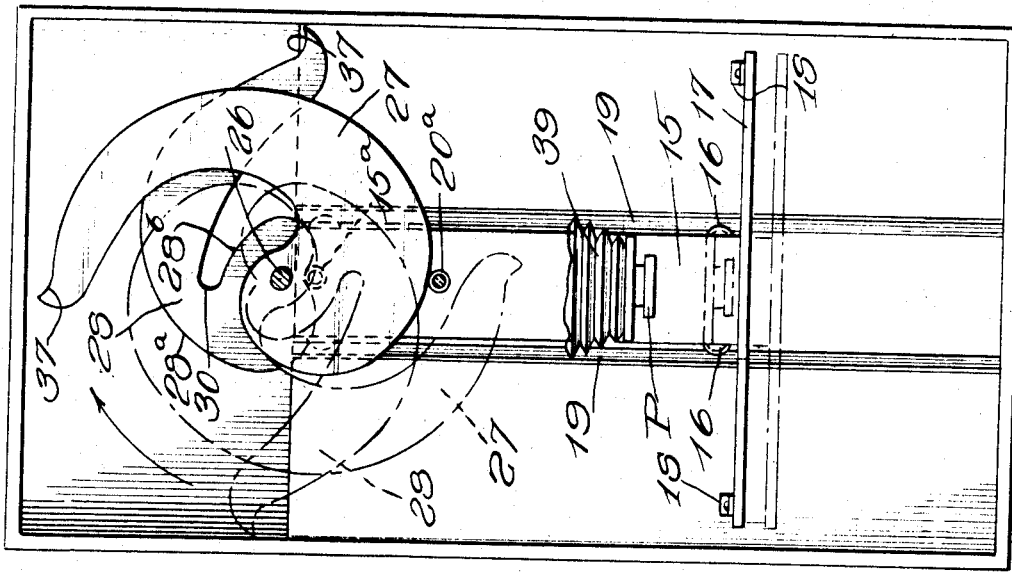
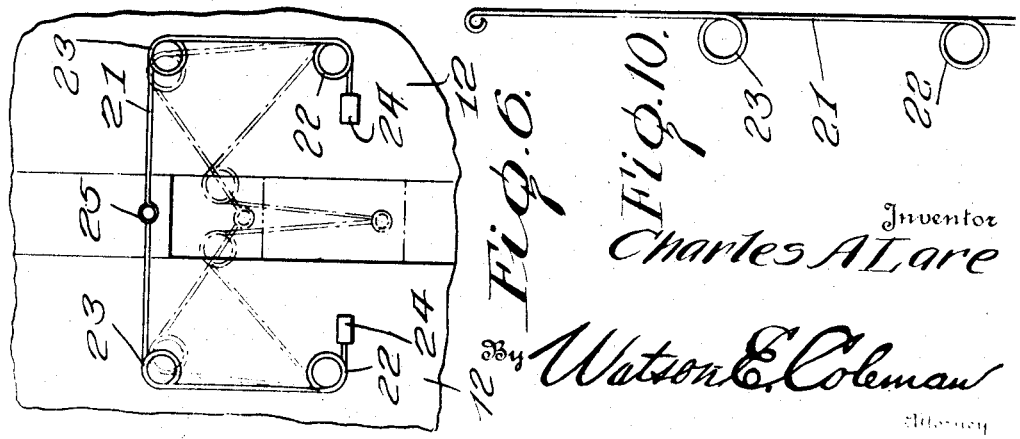

June 23, 1925.
C. A. LARE
1,543,015
COMBINED PHOTOGRAPHIC PRINTER AND ENLARGER
Filed March 5, 1923    3 Sheets-Sheet 3
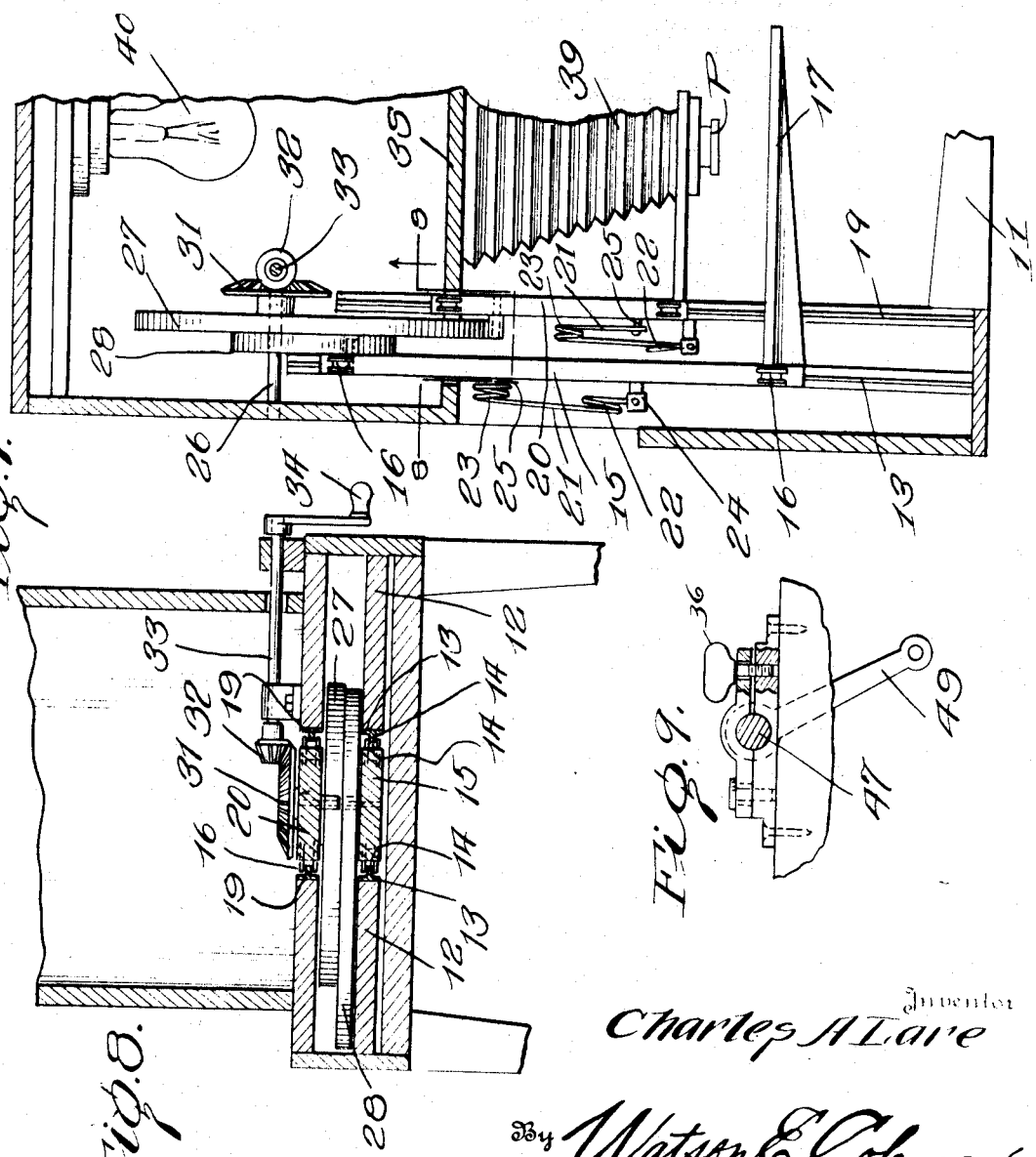

Patented June 23, 1925.

1,543,015

UNITED STATES PATENT OFFICE.

CHARLES A. LARE, OF BALTIMORE, MARYLAND.

COMBINED PHOTOGRAPHIC PRINTER AND ENLARGER.

Application filed March 5, 1923. Serial No. 622,945.

*To all whom it may concern:*

Be it known that I, CHARLES A. LARE, a citizen of the United States, residing at Baltimore and State of Maryland, have invented certain new and useful Improvements in Combined Photographic Printers and Enlargers, of which the following is a specification, reference being had to the accompanying drawings.

This invention relates to improvements in combined enlarging, reducing and copying cameras.

An important object of the invention is to provide a novel and improved cam mechanism for use in controlling the movements of the easel and lens of the camera whereby upon the rotation of the shaft continuously in one direction the camera may be shifted from a position giving maximum enlargement to a position giving maximum reduction of which the machine is capable, and whereby the easel is maintained at the proper focusing point in relation to the lens of the camera at all points during its travel.

A further object of the invention is to provide a device of this character including means for indicating the reproduction point of the camera, that is to say, the position of the lens and easel wherein the negative being printed or reproduced is exactly duplicated as to size.

A still further object of the invention is to provide a device of this character which may be readily and cheaply produced and which may be employed in cameras regardless of the particular construction of the light box thereof.

These and other objects I attain by the structure shown in the accompanying drawings, wherein for the purpose of illustration is shown a preferred embodiment of my invention and wherein like reference characters designate like parts throughout.

In the drawings:—

Figure 1 is a side elevation showing a vertical camera constructed in accordance with my invention, parts of the light box being broken away;

Figure 2 is a front elevation of the camera shown in Figure 1;

Figure 3 is a reduced side elevation showing the camera employed horizontally;

Figure 4 is a partialy diagrammatic view showing the movement of the easel and lens from maximum enlargement to minimum reduction;

Figure 5 is a similar view showing the movement from reproducing point to minimum reduction;

Figure 6 is a fragmentary elevation showing the springs employed for projecting the slides;

Figure 7 is a sectional view showing the mounting of the cams and springs;

Figure 8 is a section on line 8—8 of Figure 7;

Figure 9 is a view of the clamp of the cam control shaft; and

Figure 10 is a detailed view of the spring employed.

Referring now more particularly to the drawings, the numeral 10 designates spaced side members which form the principal supports for the camera. Where the camera is employed vertically these side members will have attached thereto at the lower ends thereof bracing legs 11 extending beneath the light box hereinafter more particularly described. Where the camera is employed horizontally the side members will be provided with the legs 11 at opposite ends thereof to support the same.

Secured to the side members and extending inwardly therefrom are a pair of guide rails 12, the adjacent faces of which are spaced from one another and provided with facing strips 13 having projecting outwardly therefrom ribs 14. Mounted between the adjacent faces of the guide rails 12 is an easel slide 15 provided at each side thereof adjacent its top and bottom with a rotatably mounted grooved roller 16 receiving in the groove thereof the ribs 14 of the strips 13. The easel slide 15 forms a support for an easel 17 having clips 18, by means of which the sensitized paper may be held thereon in the usual manner.

Likewise secured to the side members 10 and having their lower ends arranged above the guide rails 12 are a similar pair of guide rails 19, adjacent faces of the rails 12 and 19 being spaced. Between the rails 19 is mounted in a manner similar to the mounting of the easel slide 15 a lens plate slide 20 similar to the slide 15. To each of the guide rails 12 adjacent the lower end thereof is secured one end of a spring 21, the springs being so connected that they normally extend in a direction away from one another and away from the space between the guide rails. Each spring 21 is formed from a single strip of spring wire bent to form a pair of spaced loops 22 and 23, one loop 22 being arranged immediately adjacent the attaching plate 24, by means of which an end of the spring is attached to its associated guide rail 12. These springs are then upwardly and inwardly bent and the free ends thereof attached to a common point 25 upon the slide 15.

In operation, as the slide 15 is moved from its uppermost position, the initial movement of the spring is to bend the same about the loop 23 which is arranged next adjacent the end attached to the slide, then to bend the springs 21 about the loop 22 until the end of the spring attached to the guide comes in approximate alignment with the point of attachment represented by the plates 24, after which all subsequent bending movement of the springs will be about the loop 22. It will be obvious that as the bending movement of the loop 23 continues the spring will arrive at a point where this loop is so positioned that its tendency to align the associated straight portions of the spring will result in a tendency to move the slide in a direction transverse to the guides with the result that no pressure is exerted by that portion of the spring containing the loop 23 to shift the slide upwardly. At this time the loop 22 is being tensioned and this tension acts to force the slide upwardly. It will also be obvious that as the tendency of the loop 23 to force the slide upwardly decreases the tendency of the loop 22 to force the slide upwardly increases with the result that the slide is forced upwardly with a substantially uniform pressure throughout the limits of its travel. The springs 21 act to shift the slide 15 upwardly and to move the easel toward the lens plate 19. The guide rails 19 and lens plate slide 20 are similarly equipped with the springs 21, the springs being positioned to constantly urge the slide toward the light box and accordingly away from the easel 15.

Rotatably mounted perpendicularly as regards the slides 15 and 20 and adjacent the ends of the guide rails 12 and 19 toward which the springs 21 urge the slides 15 and 20 is a shaft 26 which is provided intermediate the pairs of guide rails with a pair of cams 27 and 28. Each slide 15 and 20 has secured thereto a roller, these rollers being designated at 15$^a$ and 20$^a$ respectively and being maintained in engagement with the cams 28 and 27. The cam 27 which coacts with the roller of the lens plate 10 has its working face in the form of a spiral preferably constructed so as to move the lens plate slide and accordingly the lens plate toward the easel 17 at a fixed rate of speed upon a fixed rotation of the shaft 26 or to permit this slide to be moved away from the easel by its springs 21 at such fixed rate of speed. The cam 27 has its working face constructed to maintain the easel 17 constantly at the focus of the lens 10 during the travel thereof and at the same time so position the easel during this travel that while the lens plate and its slide are moving from the lowermost point of their travel to the highest point thereof, the easel is moved initially toward the lens plate at a speed less than the speed of movement of the lens plate toward the axis of the cam and subsequently moved away from the lens plate and the axis of the cam. During the initial travel of the easel the reducing features are provided, while during the last portion thereof the enlarging features are provided.

To this end the cam 28 is formed with its working face in two parts 28$^a$ and 28$^b$, these working faces being joined at a point 30 in the form of a cove which, when engaged by the roller 15$^a$, positions the easel with relation to the lens plate in such manner that a direct print result is obtained. In other words, the print obtained will be of the same size as the negative employed. From this cove 30 the working face on that portion thereof, designated at 28$^a$, is in the form of an increasing spiral, and similarly the working face 28$^b$ is in the form of an increasing spiral so that with the roller positioned at the cove 30 regardless of the direction of rotation of the cam 28, the roller 15$^a$ and easel slide will be moved away from the center of the cam and accordingly away from the lens plate P. However, when the roller 15$^a$ is engaged in the cove 30, if the cam 28 be rotated in a direction to cause this roller and its slide to be moved downwardly by the cam faces 28$^a$, the cam 27 is likewise rotated in a direction to force the slide 20 downwardly, and since the cam 27 has its face more abrupt than the face 28$^a$ of the cam 28, the lens plate will approach the easel, with the result that the image upon the easel from the lens is reduced.

If the rotation of the cams 27 and 28 be in the opposite direction, the slide 20 is elevated by its springs, whereas the slide 15 is depressed against the action of its springs with the result that the easel and lens plate separate and the image is enlarged. The contour of the faces 28$^a$ and 28$^b$ of the cam 28 will, of course, be largely governed by the lens employed at the lens plate P and must be cut to maintain the easel 17 at the proper focal point of the lens at all points of travel of the easel and lens.

As a means of rotating the shaft 26, I provide upon the inner end of the shaft a large gear 31 which is engaged by a pinion 32 carried by a transversely extending shaft 33 which may be rotatably mounted in the light box if so desired. The outer end of this shaft is provided with an operating crank 34 and exteriorly of the light box a bearing 35 is provided so constructed that by tightening the retaining screws 36 thereof the cap of the bearing may be brought into binding engagement with the shaft to frictionally resist rotation of the same, it being understood that the pressure of the springs forcing the slides upwardly and the engagement of the rollers of the slides with the cams will have a tendency to rotate the shaft unless some such means is provided, although such tendency is to a great extent reduced by the provision of the large gear upon the shaft 26 and the pinion upon the shaft 32 to engage the same. It is here pointed out that the cove 30 of the cam 28 will act substantially as a stop advising the operator that the camera is positioned for straight reproduction when engaged by its roller, movement of the shaft in either direction being resisted.

In order to prevent overrunning of the cams and a rotation of the shaft 33 in opposition directions be positively limited, I provide upon each of the cams at the extremity of the working face thereof a hook-shaped portion 37 engaging about the roller when the cam arrives at the end of its working face. The light box is secured to the supports 10 in any suitable manner and may be constructed of any suitable material, one wall of the light box forming a bellows panel 38, to which is attached a bellows 39 connecting the light box and the lens. At the opposite wall of the light box from the bellows panel there is a lighting element 40, which may be of any desired type.

It will be seen from the foregoing that a single operating mechanism controls the focusing and determines the size of the resulting print, and that therefore the operation of the camera will be very greatly simplified. Reverting to the springs 21 attention is directed to the fact that each of these springs is in effect a plurality of springs represented by the loops 22 and 23, these springs being connected by means of substantially rigid links so connected with the springs and with the slides and guides as to separately and successively bring the springs into operation to provide a movement for the slide. Such structure is of considerable importance in cameras where a slide movement in one direction is necessary since it eliminates, where substituted for springs, a variation in the tension applied to the slide, and where substituted for weights, the cumbersome accessories necessary. It will furthermore be obvious that the structural details hereinbefore set forth are capable of some change and modification without materially departing from the spirit of my invention and I accordingly do not limit myself to such specific structure except as hereinafter claimed.

I claim:—

1. A photographic printing apparatus including a source of light, a lens, means for supporting the element to be printed intermediate the lens and light, an easel, shiftable supports for said lens and easel, a pair of cams, contact members carried by said easel and lens supports each engaging one of said cams, means for maintaining the contact elements in engagement with the cams, and means for simultaneously rotating said cams to thereby shift the easel and object support, the working face of the cam shifting said lens support being constructed in the form of a spiral, the working face of the cam operating the easel being formed in two joined sections, each of said sections being in the form of an increasing spiral from the junction of the sections.

2. A photographic printing apparatus including a source of light, a lens, means for supporting the element to be printed intermediate the lens and light, an easel, shiftable supports for said lens and easel, a pair of cams, a contact member carried by each of said supports engaging one of said cams, means for maintaing the contact elements in engagement with the cams, and means for simultaneously rotating said cams to thereby shift the easel and object support, the working face of the cam being constructed in the form of a spiral, the working face of the cam operating the easel being formed in two joined sections, each of said sections being in the form of an increasing spiral from the junction of the sections, the last named cam being provided at the junction of the sections with a cove in which the contact member of the easel support is engaged when the lens is focused to reproduce the element to be printed as to size.

3. A photographic printing apparatus including a source of light, a lens, means for supporting the element to be printed intermediate the lens and light, a sensitized paper support, a cam for shifting the lens toward and away from the source of light, a second cam simultaneously shifting the support to maintain the same continuously at the focal point of the lens throughout its travel from a desired maximum enlargement focus to a desired minimum reduction focus, and a common operating element for both of said cams, the ends of the working faces of said cams being constructed to constitute stops limiting the rotation of the cams.

4. In photographic printing apparatus and in combination spaced pairs of spaced slide guides, a slide operating intermediate each pair of guides, a lens mounted upon one of said slides, an easel mounted upon the other of said slides, a shaft rotatably mounted transversely of the pairs of guides, a pair of cams secured thereto and each having a working face, a contact member carried by each slide, means engaging the slides and maintaining the contact members thereof in engagement with the respective cams, means for simultaneously rotating the cams, and means for limiting the rotation of the cams in opposite directions.

In testimony whereof I hereunto affix my signature.

CHARLES A. LARE.